United States Patent [19]
Pawelek

[11] Patent Number: 6,050,580
[45] Date of Patent: Apr. 18, 2000

[54] TOW BAR FOR TOWING A TRAILING BICYCLE BY A LEADING BICYCLE

[76] Inventor: Andrzej B. Pawelek, 105 Viceroy Dr., Camillus, N.Y. 13031

[21] Appl. No.: 09/030,532

[22] Filed: Feb. 24, 1998

[51] Int. Cl.[7] ....................................................... B60D 1/00
[52] U.S. Cl. ............................ 280/204; 280/292; 280/492
[58] Field of Search ................................... 280/204, 202, 280/415.1, 416, 292, 299, 230, 231, 239, 492, 493, 494; 180/14.1

[56] References Cited

U.S. PATENT DOCUMENTS

| | | | |
|---|---|---|---|
| 412,985 | 2/1889 | Roques | 280/204 |
| 660,598 | 10/1900 | Stonebridge | 280/204 |
| 2,517,162 | 8/1950 | Arman | 280/204 |
| 2,580,112 | 12/1951 | Marchetti | 280/204 |
| 3,653,679 | 4/1972 | Howard | 280/32.7 |
| 3,843,164 | 10/1974 | Flegel | 280/492 |
| 3,993,321 | 11/1976 | Cote | 280/204 |
| 3,998,471 | 12/1976 | Lutchemeier | 280/492 |
| 4,077,646 | 3/1978 | Watkins | 280/204 |
| 4,261,592 | 4/1981 | Busseuil | 280/292 |
| 4,548,423 | 10/1985 | Craven | 280/492 |
| 4,711,461 | 12/1987 | Fromberg | 280/494 |
| 4,926,621 | 5/1990 | Torras | 56/6 |
| 4,930,752 | 6/1990 | Wolper, Jr. | 256/13.1 |
| 5,308,096 | 5/1994 | Smith | 280/204 |
| 5,454,577 | 10/1995 | Bell | 280/204 |
| 5,460,395 | 10/1995 | Chen | 280/204 |
| 5,785,335 | 7/1998 | George | 280/204 |
| 5,909,887 | 6/1999 | Hobrath | 280/32.7 |

FOREIGN PATENT DOCUMENTS

| | | |
|---|---|---|
| 787015 | 9/1935 | France . |
| 796019 | 3/1936 | France . |
| 15802 | 10/1902 | United Kingdom . |

*Primary Examiner*—J. J. Swann
*Assistant Examiner*—Christopher D Bottorff
*Attorney, Agent, or Firm*—Richard L. Miller, P.E.

[57] ABSTRACT

A tow bar for towing a trailing bicycle by a leading bicycle. The tow bar includes a leading portion for extending rearwardly from the leading bicycle, a trailing portion for extending forwardly from the trailing bicycle, and first apparatus for connecting the leading portion to the trailing portion. The leading portion includes a U-shaped bar for straddling the rear wheel of the leading bicycle and has a pair of free ends for replaceably attaching to the rear fork of the leading bicycle and second apparatus for replaceably attaching the leading portion to the rear fork of the leading bicycle. The trailing portion includes a U-shaped bar for straddling the front wheel of the trailing bicycle and has a pair of free ends for replaceably attaching to the front fork of the trailing bicycle and third apparatus for replaceably attaching the trailing portion to the front fork of the trailing bicycle. The first apparatus allows the leading portion and the trailing portion to be substantially coplanar with each other, while allowing them to pivot side to side relative to each other to accommodate for turns and allowing them to rotate axially relative to each other to accommodate for any irregularities in the ground being rode on.

27 Claims, 2 Drawing Sheets

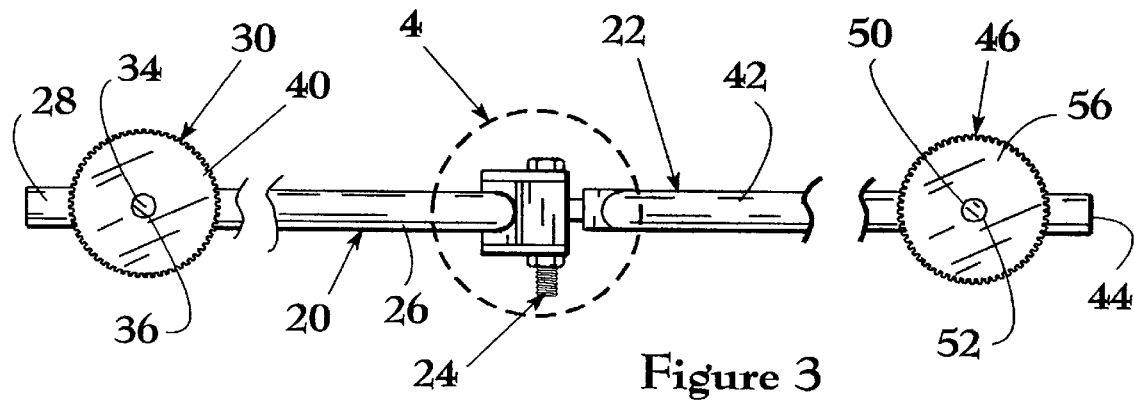
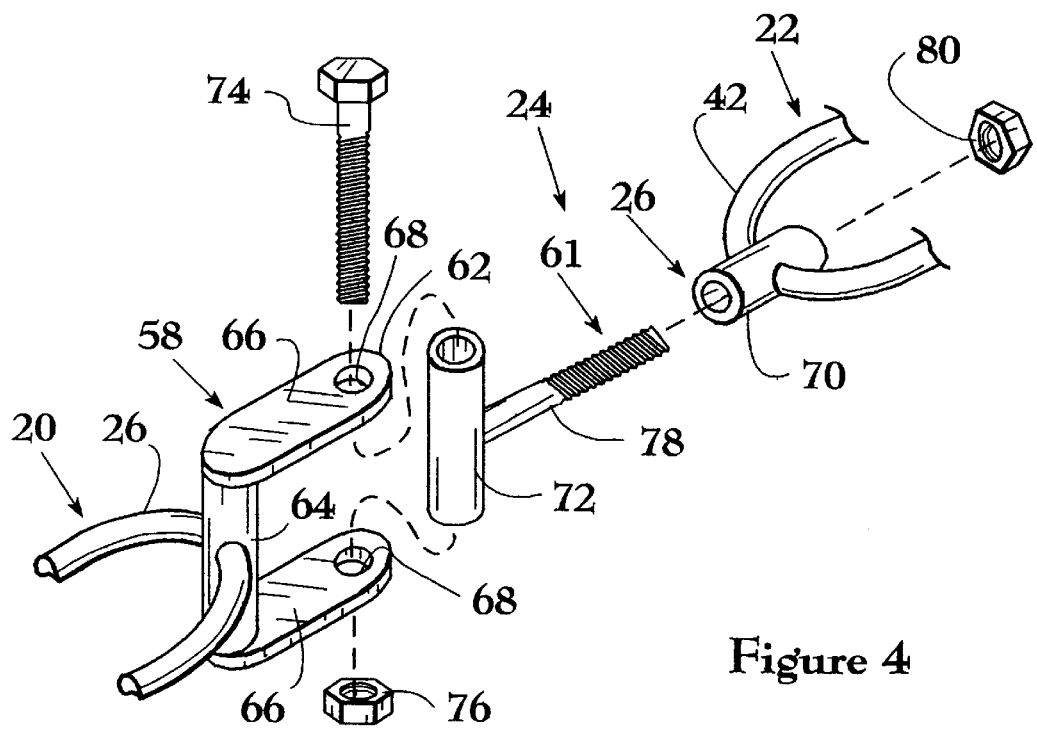

TOW BAR FOR TOWING A TRAILING BICYCLE BY A LEADING BICYCLE

BACKGROUND OF THE INVENTION

1. Field of the Invention

The present invention relates to a tow bar. More particularly, the present invention relates to a tow bar for towing a trailing bicycle by a leading bicycle.

2. Description of the Prior Art

Numerous innovations for towing devices have been provided in the prior art that will be described. Even though these innovations may be suitable for the specific individual purposes to which they address, however, they differ from the present invention.

FOR EXAMPLE, U.S. Pat. No. 4,077,646 to Watkins teaches a bicycle trailer for towing behind a bicycle that includes a box-like chassis having a forward end with a tow bar extending forward therefrom for connecting by a universal adjustable hitch means to the saddle post of a bicycle and includes a pair of independent torsion bars for suspending or supporting wheels independently to either side of the chassis with axles extending into and riding in the slot found on the side of the chassis.

ANOTHER EXAMPLE, U.S. Pat. No. 5,308,096 to Smith teaches a trailer for towing behind a bicycle and having a trailer body with a floor, side walls, front and rear walls, and an open top, a removable top cover for covering the open top, a pair of seats located in the body, side by side with one another, a rigid chassis supporting the body, to which the tow bar and wheels are mounted, a tow bar extending forwardly of the front wall movably attached to the chassis for connection to a bicycle, a pair of road wheels releasably attached to the chassis, and attachments for securing the body to an automobile roof to adapt the body for use as an automobile luggage carrier.

STILL ANOTHER EXAMPLE, U.S. Pat. No. 5,454,577 to Bell teaches a convertible trailer for towing behind a bicycle, the trailer being convertible between a trailer and a stroller. The trailer possesses a chassis frame, comprising a generally rectangular outer frame member having a front frame member, a rear frame member, and two side frame members. A tow bar is pivotally mounted to the trailer, pivotal between a towing position extending forwardly of the chassis frame, and a stroller position extending upwardly of the chassis frame. Releasible securement means is further provided for securing the low bar in the towing position and in the stroller position. A second pair of wheels are pivotally mounted on the chassis frame. Each are pivotable between a retracted position when the tow bar is in the towing position, and an extended position forward of the first pair of wheels for travel on the ground when the tow bar is in the stroller position.

FINALLY, YET ANOTHER EXAMPLE, U.S. Pat. No. 5,460,395 to Chen teaches a child carriage that is adapted to be towed by a bicycle and includes a frame extending from a front end to a back end of the carriage, and a pair of wheels rotatable on the frame. A support structure is attached to the frame and supports the child facing the front end of the carriage. A shroud including side panels and a front panel surround the child and includes windows facilitating viewing and ventilation for the child. A tow bar assembly is removably attached to either the front end or back end of the carriage and includes a coupling for attachment to the bicycle.

It is apparent that numerous innovations for towing devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a tow bar for towing a trailing bicycle by a leading bicycle that avoids the disadvantages of the prior art.

ANOTHER OBJECT of the present invention is to provide a tow bar for towing a trailing bicycle by a leading bicycle that is simple and inexpensive to manufacture.

STILL ANOTHER OBJECT of the present invention is to provide a tow bar for towing a trailing bicycle by a leading bicycle that is simple to use.

BRIEFLY STATED, YET ANOTHER OBJECT of the present invention is to provide a tow bar for towing a trailing bicycle by a leading bicycle. The tow bar includes a leading portion for extending rearwardly from the leading bicycle, a trailing portion for extending forwardly from the trailing bicycle, and first apparatus for connecting the leading portion to the trailing portion. The leading portion includes a U-shaped bar for straddling the rear wheel of the leading bicycle and has a pair of free ends for replaceably attaching to the rear fork of the leading bicycle and second apparatus for replaceably attaching the leading portion to the rear fork of the leading bicycle. The trailing portion includes a U-shaped bar for straddling the front wheel of the trailing bicycle and has a pair of free ends for replaceably attaching to the front fork of the trailing bicycle and third apparatus for replaceably attaching the trailing portion to the front fork of the trailing bicycle. The first apparatus allows the leading portion and the trailing portion to be substantially coplanar with each other, while allowing them to pivot side to side relative to each other to accommodate for turns and allowing them to rotate axially relative to each other to accommodate for any irregularities in the ground being rode on.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 3 is an enlarged diagrammatic side elevational view taken generally in the direction of arrow 3 in FIG. 2; and FIG. 4 is an enlarged exploded diagrammatic perspective view of the area generally enclosed by the dotted circles identified by arrow 4 in FIGS. 2 and 3.

Figure 1:
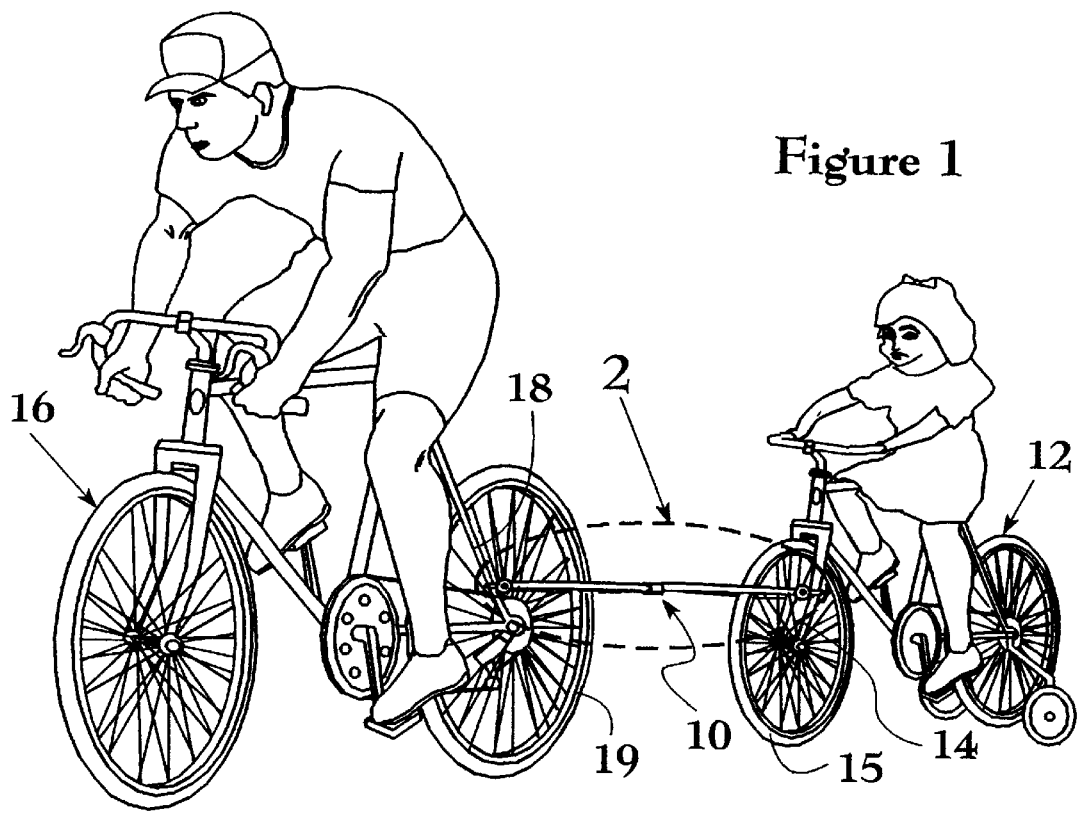
FIG. 1 is a diagrammatic perspective view of the present invention being utilized to tow a trailing bicycle by a leading bicycle.

LIST OF REFERENCE NUMERALS UTILIZED IN THE DRAWING 10 tow bar for towing a trailing bicycle by a leading bicycle of the present invention 12 trailing bicycle
14 front fork of trailing bicycle 12
15 front wheel of trailing bicycle 12
16 leading bicycle
18 rear fork of leading bicycle 16
19 rear wheel of leading bicycle 16
20 leading portion for extending rearwardly from leading bicycle 16
22 trailing portion for extending forwardly from trailing bicycle
24 connecting apparatus for connecting leading portion 20 to trailing portion
26 U-shaped bar of leading portion 20 for straddling rear wheel 19 of leading bicycle 16
28 pair of free ends of U-shaped bar 26 of leading portion 20 for replaceably attaching to rear fork 18 of leading bicycle 16
30 attaching apparatus of leading portion 20 for replaceably attaching leading portion 20 to rear fork 18 of leading bicycle 16
32 pair of throughbores in each free end of pair of free ends 28 of U-shaped bar 26 of leading portion 20
34 pair of J-shaped hooks of attaching apparatus 30 of leading portion 20
36 threaded end of each hook of pair of J-shaped hooks 34 of attaching apparatus 30 of leading portion 20
38 non-threaded end of each hook of pair of J-shaped hooks 34 of attaching apparatus 30 of leading portion 20
40 pair of thumb wheels of attaching apparatus 30 of leading portion 20
42 U-shaped bar of trailing portion 22 for straddling front wheel 15 of trailing bicycle 12
44 pair of free ends of U-shaped bar 42 of trailing portion 22 for replaceably attaching to front fork 14 of trailing bicycle 14
46 attaching apparatus of trailing portion 22 for replaceably attaching trailing portion 22 to front fork 14 of trailing bicycle 12
48 pair of throughbores in each free end of pair of free ends 44 of U-shaped bar 42 of trailing portion 22
50 pair of J-shaped hooks of attaching apparatus 46 of trailing portion 22
52 threaded end of each hook of pair of J-shaped hooks 50 of attaching apparatus 46 of trailing portion 22
54 non-threaded end of each hook of pair of J-shaped hooks 50 of attaching apparatus 46 of trailing portion 22
56 pair of thumb wheels of attaching apparatus 46 of trailing portion 22
58 front portion of connecting apparatus 24
60 trailing portion of connecting apparatus 24
61 intermediate portion of connecting apparatus 24
62 yoke of leading portion 58 of connecting apparatus 24
64 vertical portion of yoke 62 of leading portion 38 of connecting apparatus 24
66 pair of horizontal portions of yoke 62 of leading portion 58 of connecting apparatus 24
68 throughbore in each horizontal portion of pair of horizontal portions 66 of yoke 62 of leading portion 58 of connecting apparatus 24
70 stub shaft of trailing portion 60 of connecting apparatus 24
72 stub shaft of intermediate portion 61 of connecting apparatus 24
74 bolt for maintaining stub shaft 72 of intermediate portion 61 of connecting apparatus 24 movably between pair of horizontal portions 66 of yoke 62 of leading portion 58 of connecting apparatus 24
76 nut threadably engaging bolt 74
78 threaded rod of intermediate portion 61 of connecting apparatus 24
80 nut threadably engaging threaded rod 78 of intermediate portion 61 of connecting apparatus 24

DETAILED DESCRIPTION OF THE PREFERRED EMBODIMENT

Referring now to the figures in which like numerals indicate like parts, and particularly to FIG. 1, the tow bar for towing a trailing bicycle by a leading bicycle of the present invention is shown generally at 10 for towing a trailing bicycle 12 that has a front fork 14 and a front wheel 15 by a leading bicycle 16 that has a rear fork 18 and a rear wheel 19.

Figure 2:
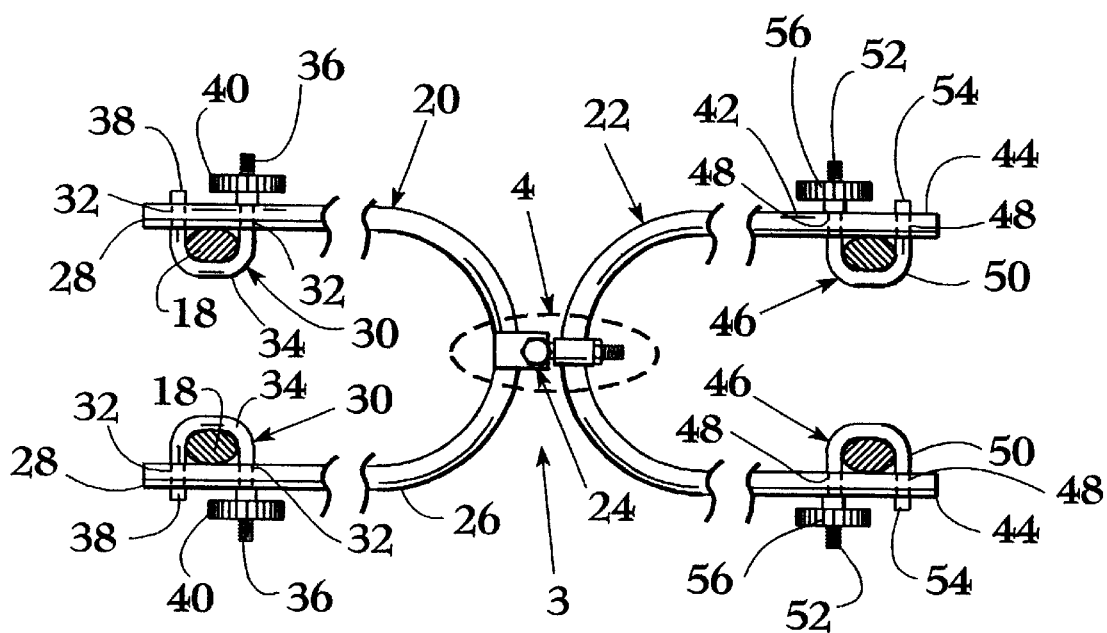
FIG. 2 is an enlarged diagrammatic top plan view of the area generally enclosed by the dotted ellipse identified by arrow 2 in FIG. 1.

The configuration of the tow bar for towing a trailing bicycle by a leading bicycle 10 can best be seen in FIGS. 2 and 3, and as such will be discussed with reference thereto.

The tow bar for towing a trailing bicycle by a leading bicycle 10 comprises a leading portion 20 for extending rearwardly from the leading bicycle 16.

The tow bar for towing a trailing bicycle by a leading bicycle 10 further comprises a trailing portion 22 for extending forwardly from the trailing bicycle 12.

The tow bar for towing a trailing bicycle by a leading bicycle 10 further comprises connecting apparatus 24 for connecting the leading portion 20 to the trailing portion 22.

The leading portion 20 comprises a U-shaped bar 26 that is tubular and opens forwardly for straddling the rear wheel 19 of the leading bicycle 16, and has a pair of free ends 28 for replaceably attaching to the rear fork 18 of the leading bicycle 16.

The leading portion 20 further comprises attaching apparatus 30 for replaceably attaching the leading portion 20 to the rear fork 18 of the leading bicycle 16.

The attaching apparatus 30 of the leading portion 20 comprises each free end of the pair of free ends 28 of the U-shaped bar 26 of the leading portion 20 having a pair of throughbores 32 that extend laterally therethrough and which are axially spaced-apart.

The attaching apparatus 30 of the leading portion 20 further comprises a pair of J-shaped hooks 34. Each hook of the pair of J-shaped hooks 34 of the attaching apparatus 30 of the leading portion 20 has a threaded end 36 and a non-threaded end 38.

Each hook of the pair J-shaped hooks 34 of the attaching apparatus 30 of the leading portion 20 extends laterally outwardly through a respective free end of the pair of free ends 28 of the U-shaped bar 26 of the leading portion 20.

The non-threaded end 38 of a respective hook of the pair J-shaped hooks 34 of the attaching apparatus 30 of the leading portion 20 extends outwardly and freely through a forwardmost throughbore of the pair of throughbores 32 in the respective free end of the pair of free ends 28 of the U-shaped bar 26 of the leading portion 20.

The threaded end 36 of the respective hook of the pair J-shaped hooks 34 of the attaching apparatus 30 of the leading portion 20 extends outwardly and freely through a rearmost throughbore of the pair of throughbores 32 in the respective free end of the pair of free ends 28 of the U-shaped bar 26 of the leading portion 20.

The attaching apparatus 30 of the leading portion 20 further comprises a pair of thumb wheels 40. A respective thumb wheel of the pair of thumb wheels 40 of the attaching apparatus 30 of the leading portion 20 threadably engages the threaded end 36 of the respective hook of the pair J-shaped hooks 34 of the attaching apparatus 30 of the leading portion 20, with a respective leg of the rear fork 18 of the leading bicycle 16 being captured between the respective free end of the pair of free ends 28 of the U-shaped bar 26 of the leading portion 20 and the respective hook of the pair J-shaped hooks 34 of the attaching apparatus 30 of the leading portion 20, and being maintained therebetween by the selective tightening of the respective thumb wheel of the pair of thumb wheels 40 of the attaching apparatus 30 of the leading portion 20 against the respective free end of the pair of free ends 28 of the U-shaped bar 26 of the leading portion 20.

The trailing portion 22 comprises a U-shaped bar 42 that is tubular and opens rearwardly for straddling the front wheel 15 of the trailing bicycle 12, and has a pair of free ends 44 for replaceably attaching to the front fork 14 of the trailing bicycle 12.

The trailing portion 22 further comprises attaching apparatus 46 for replaceably attaching the trailing portion 22 to the front fork 14 of the trailing bicycle 12.

The attaching apparatus 46 of the trailing portion 22 comprises each free end of the pair of free ends 44 of the U-shaped bar 42 of the trailing portion 22 having a pair of throughbores 48 that extend laterally therethrough and which are axially spaced-apart.

The attaching apparatus 46 of the trailing portion 22 further comprises a pair of J-shaped hooks 50. Each hook of the pair of J-shaped hooks 50 of the attaching apparatus 46 of the trailing portion 22 has a threaded end 52 and a non-threaded end 54.

Each hook of the pair J-shaped hooks 50 of the attaching apparatus 46 of the trailing portion 22 extends laterally outwardly through a respective free end of the pair of free ends 44 of the U-shaped bar 42 of the trailing portion 22.

The non-threaded end 54 of a respective hook of the pair J-shaped hooks 50 of the attaching apparatus 46 of the trailing portion 22 extends outwardly and freely through a forwardmost throughbore of the pair of throughbores 48 in the respective free end of the pair of free ends 44 of the U-shaped bar 42 of the trailing portion 22.

The threaded end 52 of the respective hook of the pair J-shaped hooks 50 of the attaching apparatus 46 of the trailing portion 22 extends outwardly and freely through a rearmost throughbore of the pair of throughbores 48 in the respective free end of the pair of free ends 44 of the U-shaped bar 42 of the trailing portion 22.

The attaching apparatus 46 of the trailing portion 22 further comprises a pair of thumb wheels 56. A respective thumb wheel of the pair of thumb wheels 56 of the attaching apparatus 46 of the trailing portion 22 threadably engages the threaded end 52 of the respective hook of the pair J-shaped hooks 50 of the attaching apparatus 46 of the trailing portion 22, with a respective leg of the front fork 14 of the trailing bicycle 12 being captured between the respective free end of the pair of free ends 44 of the U-shaped bar 42 of the trailing portion 22 and the respective hook of the pair J-shaped hooks 50 of the attaching apparatus 46 of the trailing portion 22, and being maintained therebetween by the selective tightening of the respective thumb wheel of the pair of thumb wheels 56 of the attaching apparatus 46 of the trailing portion 22 against the respective free end of the pair of free ends 44 of the U-shaped bar 42 of the trailing portion 22.

The configuration of the connecting apparatus 24 can best be seen in FIG. 4, and as such will be discussed with reference thereto.

The connecting apparatus 24 allows the leading portion 20 and the trailing portion 22 to be substantially coplanar with each other, while allowing them to pivot side to side relative to each other to accommodate for turns and allowing them to rotate axially relative to each other to accommodate for any irregularities in the ground being rode on.

The connecting apparatus 24 comprises a leading portion 58 and a trailing portion 60 that is movably connected to the leading portion 58 of the connecting apparatus 24 by an intermediate portion 61.

The leading portion 58 of the connecting apparatus 24 comprises a yoke 62 that is substantially C-shaped and opens rearwardly.

The yoke 62 of the leading portion 58 of the connecting apparatus 24 comprises a vertical portion 64 that is rod-like and extends both vertically upwardly and downwardly from, and generally perpendicular to, the U-shaped bar 26 of the leading portion 20, at its rearmost point.

The yoke 62 of the leading portion 58 of the connecting apparatus 24 further comprises a pair of horizontal portions 66 that are aligned and flat and extend rearwardly from the vertical portion 64 of the yoke 62 of the leading portion 58 of the connecting apparatus 24, at its ends.

Each horizontal portion of the pair of horizontal portions 66 of the yoke 62 of the leading portion 58 of the connecting apparatus 24 has a throughbore 68 that extends vertically therethrough, in proximity to its free end, and which are aligned with each other.

The trailing portion 60 of the connecting apparatus 24 comprises a stub shaft 70 that is tubular and extends both horizontally forwardly and rearwardly from, and generally coplanar with, the U-shaped bar 42 of the trailing portion 22, at its forwardmost point.

The intermediate portion 61 of the connecting apparatus 24 comprises a stub shaft 72 that is tubular and extends vertically and freely between the pair of horizontal portions 66 of the yoke 62 of the leading portion 58 of the connecting apparatus 24 for side to side pivotal movement relative thereto so as to allow the leading portion 20 and the trailing portion 22 to pivot from side to side relative to each other.

The stub shaft 72 of the intermediate portion 61 of the connecting apparatus 24 is maintained movably between the pair of horizontal portions 66 of the yoke 62 of the leading portion 58 of the connecting apparatus 24 by a bolt 74 that depends through the throughbore 68 in an uppermost horizontal portion of the pair of horizontal portions 66 of the yoke 62 of the leading portion 58 of the connecting apparatus 24, freely through the stub shaft 72 of the intermediate portion 61 of the connecting apparatus 24, through the throughbore 68 in a lowermost horizontal portion of the pair of horizontal portions 66 of the yoke 62 of the leading portion 58 of the connecting apparatus 24, and threadably engages a nut 76.

The intermediate portion 61 of the connecting apparatus 24 further comprises a threaded rod 78 that extends perpendicularly rearwardly from the stub shaft 72 of the intermediate portion 61 of the connecting apparatus 24, at is midpoint, and freely through the stub shaft 70 of the trailing portion 60 of the connecting apparatus 24 for axial rotation relative thereto so as to allow the leading portion 20 and the trailing portion 22 to rotate axially relative to each other.

The threaded rod 78 of the intermediate portion 61 of the connecting apparatus 24 is maintained movably in the stub shaft 70 of the trailing portion 60 of the connecting apparatus 24 by a nut 80 that threadably engages it after it exits rearwardly from the stub shaft 70 of the trailing portion 60 of the connecting apparatus 24.

It will be understood that each of the elements described above, or two or more together, may also find a useful application in other types of constructions differing from the types described above.

While the invention has been illustrated and described as embodied in a tow bar for towing a trailing bicycle by a leading bicycle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A tow bar for towing a trailing bicycle having a front fork and a front wheel by a leading bicycle having a rear fork and a rear wheel, said tow bar comprising:
   a) a leading portion for extending rearwardly from the leading bicycle; said leading portion comprising a U-shaped bar being tubular and opens forwardly for straddling the rear wheel of the leading bicycle, and having a pair of free ends for replaceably attaching to the rear fork of the leading bicycle; said leading portion further comprising second means for replaceably attaching said leading portion to the rear fork of the leading bicycle; said second means of said leading portion including each free end of said pair of free ends of said U-shaped bar of said leading portion having a pair of throughbores extending laterally therethrough and being axially spaced-apart; said second means of said leading portion further including a pair of J-shaped hooks; each hook of said pair J-shaped hooks of said second means of said leading portion extending laterally outwardly through a respective free end of said pair of free ends of said U-shaped bar of said leading portion;
   b) a trailing portion for extending forwardly from the trailing bicycle; and
   c) first means for connecting said leading portion to said trailing portion.

2. The tow bar as defined in claim 1, wherein each hook of said pair of J-shaped hooks of said second means of said leading portion has a threaded end and a non-threaded end.

3. The tow bar as defined in claim 2, wherein said non-threaded end of a respective hook of said pair J-shaped hooks of said second means of said leading portion extends outwardly and freely through a forwardmost throughbore of said pair of throughbores in said respective free end of said pair of free ends of said U-shaped bar of said leading portion.

4. The tow bar as defined in claim 2, wherein said threaded end of a respective hook of said pair J-shaped hooks of said second means of said leading portion extends outwardly and freely through a rearmost throughbore of said pair of throughbores in a respective free end of said pair of free ends of said U-shaped bar of said leading portion.

5. The tow bar as defined in claim 2, wherein said second means of said leading portion further includes a pair of thumb wheels.

6. The tow bar as defined in claim 5, wherein a respective thumb wheel of said pair of thumb wheels of said second means of said leading portion threadably engages said threaded end of a respective hook of said pair J-shaped hooks of said second means of said leading portion, with a respective leg of the rear fork of the leading bicycle for being captured between a respective free end of said pair of free ends of said U-shaped bar of said leading portion and said respective hook of said pair J-shaped hooks of said second means of said leading portion, and is maintained therebetween by the selective tightening of said respective thumb wheel of said pair of thumb wheels of said second means of said leading portion against said respective free end of said pair of free ends of said U-shaped bar of said leading portion.

7. The tow bar as defined in claim 6, wherein said trailing portion comprises a U-shaped bar that is tubular and opens rearwardly for straddling the front wheel of the trailing bicycle, and has a pair of free ends for replaceably attaching to the front fork of the trailing bicycle.

8. The tow bar as defined in claim 7, wherein said trailing portion further comprises third means for replaceably attaching said trailing portion to the front fork of the trailing bicycle.

9. The tow bar as defined in claim 8, wherein said third means of said trailing portion includes each free end of said pair of free ends of said U-shaped bar of said trailing portion having a pair of throughbores that extend laterally therethrough and which are axially spaced-apart.

10. The tow bar as defined in claim 9, wherein said third means of said trailing portion further includes a pair of J-shaped hooks.

11. The tow bar as defined in claim 10, wherein each hook of said pair of J-shaped hooks of said third means of said trailing portion has a threaded end and a non-threaded end.

12. The tow bar as defined in claim 10, wherein each hook of said pair of J-shaped hooks of said third means of said trailing portion extends laterally outwardly through a respective free end of said pair of free ends of said U-shaped bar of said trailing portion.

13. The tow bar as defined in claim 11, wherein said non-threaded end of a respective hook of said pair J-shaped hooks of said third means of said trailing portion extends outwardly and freely through a forwardmost throughbore of said pair of throughbores in a respective free end of said pair of free ends of said U-shaped bar of said trailing portion.

14. The tow bar as defined in claim 11, wherein said threaded end of a respective hook of said pair J-shaped hooks of said third means of said trailing portion extends outwardly and freely through a rearmost throughbore of said pair of throughbores in a respective free end of said pair of free ends of said U-shaped bar of said trailing portion.

15. The tow bar as defined in claim 11, wherein said third means of said trailing portion further includes a pair of thumb wheels.

16. The tow bar as defined in claim 15, wherein a respective thumb wheel of said pair of thumb wheels of said third means of said trailing portion threadably engages said threaded end of a respective hook of said pair J-shaped hooks of said third means of said trailing portion, with a respective leg of the front fork of the trailing bicycle for being captured between a respective free end of said pair of free ends of said U-shaped bar of said trailing portion and said respective hook of said pair J-shaped hooks of said third means of said trailing portion, and is maintained therebetween by the selective tightening of said respective thumb wheel of said pair of thumb wheels of said third means of said trailing portion against said respective free end of said pair of free ends of said U-shaped bar of said trailing portion.

17. The tow bar as defined in claim 1, wherein said first means allows said leading portion and said trailing portion to be substantially coplanar with each other, while allowing them to pivot side to side relative to each other to accommodate for turns and allowing them to rotate axially relative to each other to accommodate for any irregularities in the ground being rode on.

18. The tow bar as defined in claim 7, wherein said first means includes a leading portion and a trailing portion that is movably connected to said leading portion of said first means by an intermediate portion.

19. The tow bar as defined in claim 18, wherein said leading portion of said first means comprises a yoke that is substantially C-shaped and opens rearwardly.

20. The tow bar as defined in claim 19, wherein said yoke of said leading portion of said first means comprises a vertical portion that is rod-like and extends both vertically upwardly and downwardly from, and generally perpendicular to, said U-shaped bar of said leading portion, at its rearmost point.

21. The tow bar as defined in claim 20, wherein said yoke of said leading portion of said first means further comprises a pair of horizontal portions that are aligned and flat and extend rearwardly from said vertical portion of said yoke of said leading portion of said first means, at its ends.

22. The tow bar as defined in claim 21, wherein each horizontal portion of said pair of horizontal portions of said yoke of said leading portion of said first means has a throughbore that extends vertically therethrough, in proximity to its free end, and which are aligned with each other.

23. The tow bar as defined in claim 22, wherein said trailing portion of said first means comprises a stub shaft that is tubular and extends both horizontally forwardly and rearwardly from, and generally coplanar with, said U-shaped bar of said trailing portion, at its forwardmost point.

24. The tow bar as defined in claim 23, wherein said intermediate portion of said first means comprises a stub shaft that is tubular and extends vertically and freely between said pair of horizontal portions of said yoke of said leading portion of said first means for side to side pivotal movement relative thereto so as to allow said leading portion and said trailing portion to pivot from side to side relative to each other.

25. The tow bar as defined in claim 24, wherein said stub shaft of said intermediate portion of said first means is maintained movably between said pair of horizontal portions of said yoke of said leading portion of said first means by a bolt that depends through said throughbore in an uppermost horizontal portion of said pair of horizontal portions of said yoke of said leading portion of said first means, freely through said stub shaft of said intermediate portion of said first means, through said throughbore in a lowermost horizontal portion of said pair of horizontal portions of said yoke of said leading portion of said first means, and threadably engages a nut.

26. The tow bar as defined in claim 24, wherein said intermediate portion of said first means further comprises a threaded rod that extends perpendicularly rearwardly from said stub shaft of said intermediate portion of said first means, at is midpoint, and freely through said stub shaft of said trailing portion of said first means for axial rotation relative thereto so as to allow said leading portion and said trailing portion to rotate axially relative to each other.

27. The tow bar as defined in claim 26, wherein said threaded rod of said intermediate portion of said first means is maintained movably in said stub shaft of said trailing portion of said first means by a nut that threadably engages it after it exits rearwardly from said stub shaft of said trailing portion of said first means.

* * * * *